United States Patent
Bucci et al.

(10) Patent No.: US 9,344,344 B2
(45) Date of Patent: May 17, 2016

(54) PORTABLE SYSTEM FOR MONITORING NETWORK FLOW ATTRIBUTES AND ASSOCIATED METHODS

(71) Applicant: Cisco Technology, Inc., San Jose, CA (US)

(72) Inventors: Christopher Jon Bucci, Fremont, CA (US); Walter Song, San Jose, CA (US); Chao Feng, San Jose, CA (US); Samar Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 14/164,152

(22) Filed: Jan. 25, 2014

(65) Prior Publication Data

US 2015/0215183 A1    Jul. 30, 2015

(51) Int. Cl.
*H04L 12/26*    (2006.01)
*H04L 12/801*   (2013.01)
*H04L 12/751*   (2013.01)

(52) U.S. Cl.
CPC ............... *H04L 43/08* (2013.01); *H04L 45/02* (2013.01); *H04L 47/11* (2013.01)

(58) Field of Classification Search
None
See application file for complete search history.

(56) References Cited

U.S. PATENT DOCUMENTS

| | | | |
|---|---|---|---|
| 6,614,795 B1* | 9/2003 | Jimmei et al. | 370/401 |
| 7,099,281 B1* | 8/2006 | Conway | 370/252 |
| 7,590,149 B1* | 9/2009 | Bharali et al. | 370/468 |
| 7,633,944 B1* | 12/2009 | Chang et al. | 370/392 |
| 7,639,613 B1* | 12/2009 | Ghannadian et al. | 370/232 |
| 7,773,507 B1* | 8/2010 | Kasralikar et al. | 370/230 |
| 8,339,959 B1* | 12/2012 | Moisand et al. | 370/235 |
| 9,038,151 B1* | 5/2015 | Chua et al. | 726/6 |
| 2001/0055274 A1* | 12/2001 | Hegge et al. | 370/229 |

(Continued)

OTHER PUBLICATIONS

VMware and Cisco Virtualization Solution: Scale Virtual Machine Networking, Jul. 2009, Cisco Systems, Inc., 4 pages.*

*Primary Examiner* — Hassan Kizou
*Assistant Examiner* — Tejis Daya
(74) *Attorney, Agent, or Firm* — Meunier Carlin & Curfman LLC

(57) ABSTRACT

A method for monitoring flow attributes at a network node comprises detecting first information indicative of transmission of a packet through the network node. The first information is discernible from information contained within the packet. The method also comprises determining that the packet is not part of an existing flow and generating, in a flow cache memory, a new flow entry corresponding to the packet. The method further comprises receiving second information associated with the transmission of the packet through the network node. The second information is contained in a forwarding information base (FIB) stored in the network node and cannot be discerned from information contained within the packet. The method also comprises writing, in the flow cache memory, at least a portion of the second information to the new flow entry corresponding to the packet.

23 Claims, 8 Drawing Sheets

(56) References Cited

U.S. PATENT DOCUMENTS

| | | | |
|---|---|---|---|
| 2003/0110276 A1* | 6/2003 | Riddle | 709/230 |
| 2005/0259672 A1* | 11/2005 | Eduri | 370/412 |
| 2006/0045014 A1* | 3/2006 | Charzinski | 370/235 |
| 2006/0133272 A1* | 6/2006 | Yuan et al. | 370/230 |
| 2006/0272018 A1* | 11/2006 | Fouant | 726/23 |
| 2008/0159288 A1* | 7/2008 | Nagarajan et al. | 370/392 |
| 2011/0051602 A1* | 3/2011 | Matthews et al. | 370/235 |
| 2011/0255539 A1* | 10/2011 | Yumoto et al. | 370/392 |
| 2011/0310734 A1* | 12/2011 | Mizukoshi | 370/231 |
| 2011/0317559 A1* | 12/2011 | Kern et al. | 370/235 |
| 2012/0207024 A1* | 8/2012 | Kohn et al. | 370/235 |
| 2012/0320920 A1* | 12/2012 | Akiyoshi | 370/392 |

\* cited by examiner

PORTABLE SYSTEM FOR MONITORING NETWORK FLOW ATTRIBUTES AND ASSOCIATED METHODS

TECHNICAL FIELD

The present disclosure relates generally to network traffic monitoring and, more particularly, to a portable network traffic monitoring appliance and associated methods for remotely monitoring network flow attributes.

BACKGROUND

The immense growth of the Internet has spawned demand for an ever-increasing array of applications and services, many of which are distributed across systems that reside on different networks. In fact, many companies are increasingly relying on cloud computing resources to host and serve applications and services in order to leverage the flexibility, scalability, and ease of deployment offered by cloud-based technologies. While distributed- and cloud-computing environments offer unparalleled reliability and versatility, such environments are more vulnerable to denial-of-service attacks than centralized environments that have fewer components that are exposed to unsecure connections.

Detecting and mitigating the effects of denial-of-service attacks invariably involves monitoring network flow characteristics to identify patterns associated with both illegitimate and legitimate network traffic. Traffic that possesses illegitimate characteristics/behavior can be blocked, while traffic that exhibits legitimate behavior is allowed to progress through the network.

One solution for monitoring network flow patterns involves using an external network analysis sensor or "probe" that connects to a port of a switch or router. The network probe is configured to monitor raw data packets as they traverse the network. More specifically, duplicate versions of sample traffic flows are provided to the probe using a data analysis port (such as a Switched Port ANalyze ("SPAN") port) located on the network equipment. The probe then analyzes data contained in the sample traffic flows to identify potentially malicious data. While these conventional network probes may be well equipped to identify malicious attacks that have characteristics that are easily gleaned from information explicitly contained in the raw packets themselves, the probes are limited in their ability to protect against attacks caused by traffic whose raw data does not possess conspicuous information contained in the packet. Indeed, many malicious attacks use tactics that are not easily observable in the raw data itself. For example, denial-of-service attacks involve overwhelming a targeted network resource with traffic including packets with data that appears, at least at first glance, legitimate. These types of attacks may require observing certain implicit characteristics of the traffic behavior, which is not typically detectable in the data provided at a SPAN port.

In order to provide a more robust network monitoring solution, some switches and routers include on-board network monitoring capabilities that enable detection of certain malicious network flow patterns. Such on-board processing within the switch (or router) allows for the relatively easy, near real-time observation of certain implicit network traffic information that is not provided by a SPAN copy such as, for example, data indicative of ingress/egress switch interfaces, next-hop route decisions, and source/destination autonomous system (AS) numbers. Network equipment equipped with these capabilities allow for monitoring of both the explicit and implicit clues indicative of a malicious network attack.

Although switches and routers that provide on-board network flow monitoring solutions provide access to more information that can be evaluated to detect a malicious attack, they may still be deficient in many regards. Specifically, on-board flow monitoring involves resource-intensive operations, which burden the on-board processor and memory and ultimately slow the core functionality of the device. Furthermore, during a denial of service attack—a time at which flow monitoring is most critical in the detection and mitigation of the attack—on-board network flow monitoring capabilities tend to be compromised along with other processing functions of the switch.

The presently disclosed systems and methods for monitoring network flow attributes are directed to overcoming one or more of the problems set forth above and/or other problems in the art.

DETAILED DESCRIPTION

Figure 1A:
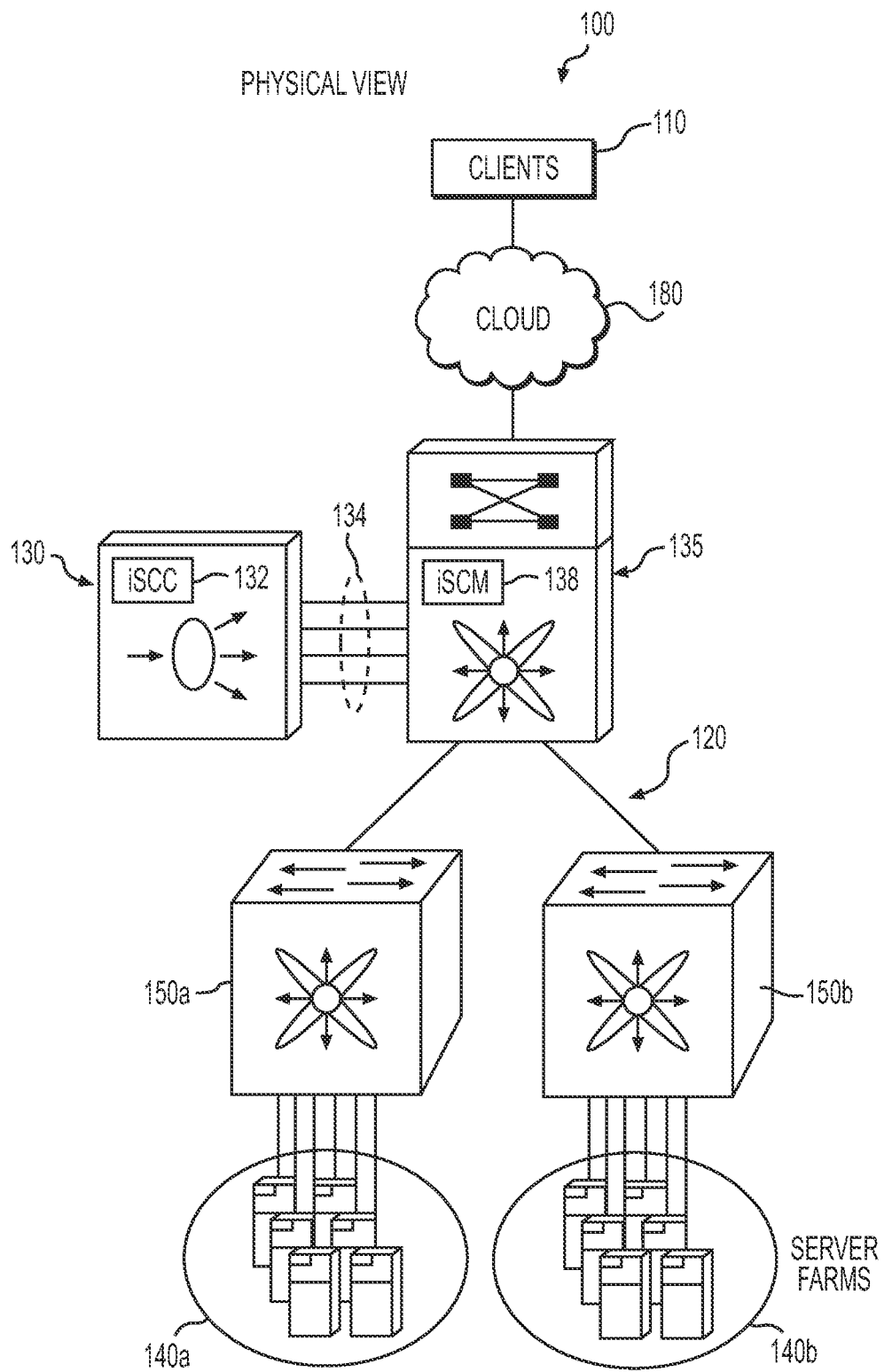
FIG. 1A provides a schematic diagram of an exemplary physical view of network environment 100, in which the presently disclosed systems and methods for monitoring network flow attributes may be implemented, in accordance with the disclosed embodiments.

In accordance with one aspect, the present disclosure is directed to a computer-implemented method for monitoring flow attributes at a network node. The method comprises detecting, at a network probe coupled to the network node, first information indicative of transmission of a packet through the network node, the first information being discernible from information contained within the packet. The method also comprises determining, by the network probe, that the packet is not part of an existing flow, and generating, in a flow cache memory of the network probe, a new flow entry corresponding to the packet. The method also includes receiving, from the network node, second information associated with the transmission of the packet through the network node. The second information may be contained in a forwarding information base (FIB) stored in the network node and cannot be discerned from information contained within the packet. The method may also comprise writing, in the flow cache memory, at least a portion of the second information to the new flow entry corresponding to the packet.

According to another aspect, the present disclosure is directed to a computer-implemented method for monitoring flow attributes at a network node. The method may comprise detecting, at a network probe coupled to the network node, first information indicative of transmission of a packet through the network node, the first information being discernible from information contained within the packet. The method may also comprise comparing the information indicative of the transmission of the packet with information contained in a forwarding information base (FIB) associated with the network node. The method may further comprise determining, based on the comparison, that the packet is not part of an existing flow, and generating, in a flow cache memory of the network probe, a new flow entry corresponding to the packet. The method may further comprise retrieving, from the network node, an updated FIB containing second information associated with the transmission of the packet through the network node, the second information not discernible from information contained within the packet. The method may also comprise writing, in the flow cache memory, at least a portion of the second information to the new flow entry corresponding to the packet.

In accordance with yet another aspect, the present disclosure is directed to an apparatus for monitoring network flow parameters in a network node, the system configured for coupling the network node via an externally-accessible port of the network node. The apparatus may comprise a flow cache memory configured to store network traffic parameters associated with existing network packet flows. The method may also comprise a processor, communicatively coupled to the flow cache memory and configured to detect first information indicative of transmission of a packet through the network node, the first information being discernible from information contained within the packet. The processor may also be configured to determine that the packet is not part of an existing network flow, and create, in the flow cache memory, a new flow entry corresponding to the packet. The processor may be further configured to receive second information associated with the transmission of the packet through the network node, the second information contained in a forwarding information base (FIB) stored in the network node and which cannot be discerned from information contained within the packet. The processor may also be configured to write, in the flow cache memory, at least a portion of the second information to the new flow entry corresponding to the packet.

FIG. 1A is a schematic diagram illustrating a physical view of a system 100 for configuring service appliances, such as the presently-disclosed portable device for measuring network flow, as virtual line cards in a network environment. FIG. 1A includes a communication platform 120 that connects one or more server farms 140a and 140b to one or more clients 110 via cloud 180. Cloud 180 may encompass any public, semi-public, or private networks, including enterprise networks, the Internet, community networks, etc. Individual servers in server farm 140a and 140b may communicate within the same farm via switches 150a and 150b, respectively. Servers in server farm 140a may communicate with servers in server farm 140b via a switch 135.

A service appliance 130 may connect to switch 135 over a communication channel, such as a port-channel 134. As used herein, a "communication channel" encompasses a physical transmission medium (e.g., a wire), and a logical connection (e.g., a radio channel) used to convey information signals (e.g., data packets) from one or more senders (e.g., switch 135) to one or more receivers e.g., service appliance 130). A communication channel can include one or more communication links, which may be physical (e.g., wire) or logical (e.g., data link). Termination points of communication links (or communication channels) can include interfaces, such as Ethernet ports, serial ports, etc.

As used herein, a "service appliance" is a discrete (and generally separate) hardware device with integrated software (e.g., firmware), specifically designed to provide one or more network services, including load balancing, firewall, intrusion prevention, virtual private network (VPN), proxy, etc. According to embodiments of the present disclosure, switch 135 may be configured with an intelligent service card manager module (iGSM) 138, and service appliance 130 may be configured with a corresponding intelligent service card client module (iSCC) 132. iSCM 138 and iSCC 132 form part of a Remote Integrated Service Engine (RISE) infrastructure for configuring service appliance 130 as a virtual line card in switch 135.

According to embodiments consistent with the present disclosure service appliance 130 may be embodied as a portable network probe device or appliance that has been adapted to monitor network flow parameters and determine, collect, and/or retrieve all the meaningful network flow parameters that can be determined by the network switch, including those are explicitly discernible from the packet information itself, as well as those that cannot be explicitly discerned from the packet information alone. Parameters that are typically discernible from the packet information alone include one or more of a source IP address associated with the packet, a destination IP address associated with the packet, a packet count, an octet count, information identifying a first packet associated with a flow containing the packet, information identifying a last packet associated with the flow containing the packet, a source port, a destination port, a TCP flag, an IP protocol, or a type of service associated with the packet. Parameters that are generally not discernible from the packet information alone include one or more of a next hop for the packet, an input interface, an output interface, an indication of a source autonomous system (AS) from which the packet was generated, an indication of a destination AS to which the packet is being sent, information indicative of a source mask associated with the packet, or information indicative of a destination mask associated with the packet.

Figure 1B:
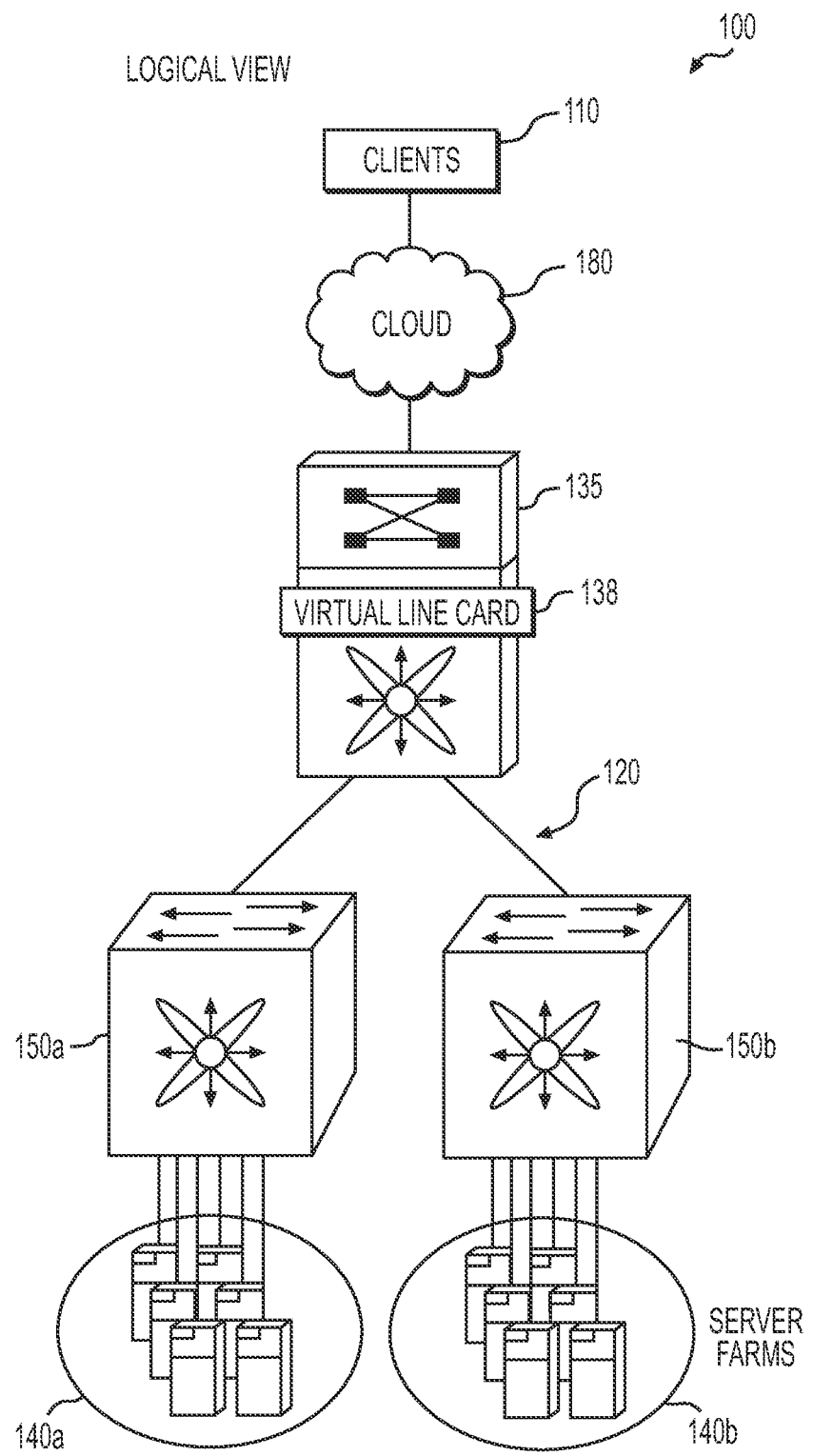
FIG. 1B provides a schematic diagram of an exemplary logical view of network environment corresponding to the physical view illustrated in FIG. 1A, in which the presently disclosed systems and methods for monitoring network flow attributes are configured to behave as a virtual line card associated with a network switch, consistent with the disclosed embodiments.

FIG. 1B is a simplified schematic diagram illustrating a logical view of system 100. According to the embodiment disclosed in FIG. 1B, iSCC 132 and iSCM 138 (shown in FIG. 1A) may be configured to make a service appliance, such as network probe 130 logically behave as a virtual line card 138 of switch 135, meaning that network probe 130 effectively functions as an integrated component within switch 135. The terms "line card" and "service module" are interchangeably used herein to refer to modular electronic circuits interfacing telecommunication lines such as copper wires or optical fibers to the rest of a telecommunications network. A virtual service module (or a virtual line card) is a logical instance (of a service module) that provides the same functionality as the service module. Service modules may perform various functions, including the provision of network services, similar to service appliances. The major difference between a service module and a service appliance is that the service module is physically located within a switch, for example, on an appropriate slot. Virtual service modules are similarly configurable within a switch.

According to embodiments of the present disclosure, an appliance user can enjoy the same benefit of a service module's simple configuration and operation using the infrastructure of system 100. Manual configuration of service appliance, such as portable network probe 130, is no longer required. Substantially all such configurations may be made via switch 135, instead of network probe 130. Network probe 130 may offload (i.e., transfer) any network (e.g., L2/L3 network) specific control plane and data plane operations to switch 135. Data path acceleration leveraging application specific integrated circuit (ASIC) that may be embedded in switch 135 may also be possible in various embodiments. Switch 135 may communicate control messages to network probe 130 over port-channel 134. Thus, configuration and provisioning of services within network probe 130 may be implemented at switch 135.

In various embodiments, network flow monitoring appliance 130 can be standard hardware that can be vendor agnostic while being cheap and fast-to-market. Network flow monitoring appliance 130 may be configured as an in-chassis service module to seamlessly provide network services without additional configuration issues. According to embodiments of system 100, appliance configurations need not be reconciled with network configurations. Because network flow monitoring appliance 130 offloads network specific (L2/L3) network control plane and network data plane operations from switch 135, network and server administrative functions can be clearly demarcated.

Turning to the infrastructure of FIGS. 1A and 1B, the example network environment may be configured as one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 1A and 1B may be coupled to one another through one or more interfaces employing any suitable connection (wired or wireless), which provides a viable pathway for electronic communications. Additionally, any one or more of these elements may be combined or removed from the architecture based on particular configuration needs. System 100 may include a configuration capable of transmission control protocol/Internet protocol (TCP/IP) communications for the electronic transmission or reception of packets in a network. System 100 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 100, including switches 135, 150a and 150b, may include any type of network element connecting network segments. For example, switches 135, 150a and 150b may include multi-port network bridges that processes and routes data at a data link layer (Layer 2). In another example, switches 135, 150a and 150b may process data at a network layer (Layer 3), or Layer 4 (with network address translation and load distribution), or Layer 7 (load distribution based on application specific transactions) or at multiple layers (e.g., Layer 2 and Layer 3). In certain embodiments, functionalities of switches 135, 150a and 150b may be integrated into other network devices, such as routers or servers. In various embodiments, switches 135, 150a and 150b may be managed switches (e.g., managed using CLI, web interface, etc.).

Port-channel 134 may encompass an aggregation of multiple physical interfaces into one logical interface, for example, to provide higher aggregated bandwidth, load balancing and link redundancy. Port-channel 134 can provide a high availability channel: if one link fails, traffic previously carried on this link can be switched to the remaining links. Port-channel 134 may contain up to 16 physical communication links and may span multiple modules for added high availability. In one embodiment, port-channel 134 represents an aggregation of four point-to-point communication links over multiple ports. In another eMbodiment, port-channel 134 can represent a virtual port-channel (vPC).

Although FIGS. 1A and 1B show server farms 140a and 140b, it will be appreciated that system 100 is not limited to servers. In fact, any network element may be connected to network 120 via appropriate switches as suited and based on particular needs. As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 140a and 140b may be replaced with LANs connecting desktop computers in a small office. In another example, server farms 140a and 140b may be replaced with a network of wireless communication devices. In yet another example, server farms 140a and 140b may be replaced with one or more supercomputers. Various other configurations and devices are contemplated within the broad scope of the present disclosure.

According to embodiments of the present disclosure, system 100 may provide for a fabric extender (FEX)-like protocol, auto-discovery, message transport service (MTS)-like control messages, and defined messages between network flow monitoring appliance 130 and switch 135. Configuration of network flow monitoring appliance 130 may be performed on switch 135 as for a line card. Data path forwarding may be off-loaded to virtual line card 138. Control path processing may be offloaded to a supervisor engine on switch 135 as appropriate. In embodiments where network flow monitoring appliance 130 has multiple virtual services (e.g., virtual machines), each virtual service may be a separate virtual line card on switch 135.

Note that the numerical and letter designations assigned to the elements of FIGS. 1A and 1B do not connote any type of hierarchy; the designations are arbitrary and have been used solely for purposes of illustration/explanation. Such designations should not be construed in any way to limit their capabilities, functionalities, or applications in the potential environments that may benefit from the features of system 100. For ease of description, only two representative server farms are illustrated in FIGS. 1A and 1B. Any number of server farms and switches may be connected in network 120 within the broad scope of the present disclosure.

One or more of components shown in FIGS. 1A and 1B, such as network flow monitoring system 130 and/or servers 135, 150*a*, or 150*b* may embody one or more components associated with a general purpose or special purpose computer (not shown), such as a processor, RAM, ROM, storage memory, database, I/O devices, and network interface components.

Processor may include one or more microprocessors, each configured to execute instructions and process data to perform one or more functions associated with a network. Processor may be communicatively coupled to RAM, ROM, storage device, database, I/O devices, and network interface. Processor may be configured to execute sequences of computer program instructions to perform various processes, which will be described in detail below. The computer program instructions may be loaded into RAM for execution by processor.

Computer-readable media, such as RAM, ROM, and storage device, may be configured to store computer-readable instructions that, when executed by processor, may cause performance of functions or tasks associated with system 100. For example, computer readable media may include instructions for performing one or more methods for monitoring network flow attributes. Exemplary methods for which computer-readable media may contain instructions will be described in greater detail below. It is contemplated that each portion of a method described herein may have corresponding instructions stored in computer-readable media for causing one or more components of system 100 to perform the method described.

I/O devices may include one or more components configured to communicate information with a user associated with system 100. For example, I/O devices may include a console with an integrated keyboard and mouse to allow a user to input parameters (e.g., network management parameters) associated with system 100. I/O devices may also include a display including a graphical user interface (GUI) for outputting information on a monitor. I/O devices may also include peripheral devices such as, for example, a printer for printing information associated with system 100, a user-accessible disk drive (e.g., a USB port, a floppy, CD-ROM, or DVD-ROM drive, etc.) to allow a user to input data stored on a portable media device, a microphone, a speaker system, or any other suitable type of interface device. For example, I/O devices may include an electronic interface that allows a user to input patient network management parameters into system 100.

Figure 2:
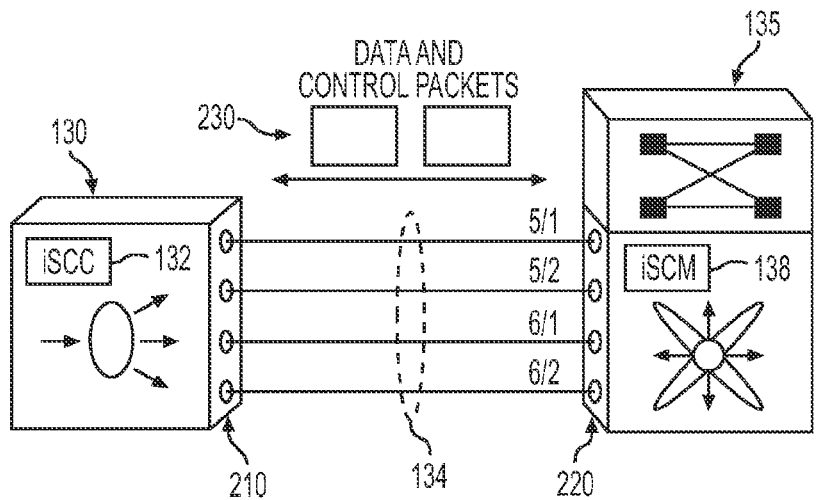
FIG. 2 provides a schematic diagram of an exemplary command and configuration interface between a service appliance, such a portable system for monitoring network flow attributes, and a network switch, in accordance with certain disclosed embodiments.

FIG. 2 illustrates an exemplary communication interface between a portable network flow monitoring appliance 130 (e.g., a network probe) and a network switch 135. Network flow monitoring appliance 130 includes appliance ports 210. Switch 135 may include switch ports 220. Appliance ports 210 and switch ports 220 may be connected to form port-channel 134. Switch ports 220 may be line card ports of the same type (e.g., Ethernet) as appliance ports 210. Data and control packets 230 may be communicated through port-channel 134 between iSCM 138 on switch 135 and iSCC 132 on network flow monitoring appliance 130. In example embodiments, the control messages may be in MTS payload format; the transport may be in UDP protocol; and integration may follow a box-in-box model. In one example embodiment, the user (e.g., a network administrator) may allocate switch ports 220 for connection to network flow monitoring appliance 130 and configure switch ports 220 as a port-channel in trunk switch-mode associating a list of VLANs.

In example embodiments, a management IP address can be configured as a sub-interface on port-channel 134 and network flow monitoring appliance configuration can be done using any existing appliance configuration model on the management sub-interface. Network flow monitoring appliance 130 may communicate various information such as application status, statistics and license information, etc. to switch 135. Switch 135 may communicate various information, such as virtual device contexts (VDCs), VLANs, In-Service Software Upgrades (ISSU), and VLAN autostates, to network flow monitoring appliance 130 on port channel 134.

In various embodiments, RISE, implemented as iSCC 132 in network flow monitoring appliance 130, and counterpart iSCM 138 in switch 135, can provide a plug-and-play approach to configure network flow monitoring appliance 130 as virtual line card 138. In an example embodiment, iSCM 138 may be implemented in a supervisor engine of switch 135. Note that port-channel 134 may be interchangeably referred to herein as RISE channel. iSCC 132 and iSCM 138 may interact to provide the RISE channel. In one embodiment, a default mode for network flow monitoring appliance 130 is set to RISE mode (e.g., iSCC 132 is active) and appliance ports 210 are set in operation mode. When a user configures the RISE channel, a RISE-Discovery Packet (RISE-DP) is sent out from switch 135 using a multicast address. In response, service appliance 130 sends out a response packet, performing a handshake to establish bootstrap. As a result, the appropriate switch IP (e.g., supervisor IP) and the service appliance IP are made known to both devices for subsequent control-message communication between network flow monitoring appliance 130 and switch 135.

In specific embodiments, auto-discovery and bootstrap may be supported in a directly attached mode. To configure network flow monitoring appliance 130 as virtual line card 138, appliance ports 210 may be connected to switch ports 220. Port-channel 134 may be subsequently configured appropriately (e.g., through appropriate commands on CLI, such as switch(config)# interface port-channel 100, etc.). In an embodiment where vPC is used, the vPC may also be appropriately configured (e.g., by providing an appropriate vPC number). Each switch port 220 may also be configured in RISE mode. For example, according to the embodiment shown in FIG. 2, Ethernet ports 5/1 (e.g., slot 5, port 1), 5/2, 6/1, and 6/2 are configured in RISE mode for port-channel 134. After appropriate service instances are constructed and VLAN groups assigned, and other configuration steps, network flow monitoring appliance 130 appears as virtual line card 138 in switch 135. The appliance serial number may be associated with a virtual slot number for network flow monitoring appliance 130. A "show module service" command may display network flow monitoring appliance 130 as being active on a virtual slot.

As used herein, a "service instance" occurs when a network element (e.g., switch 135, a server in server farm 140*a*, etc.) requests and successfully engages one or more services from network flow monitoring appliance 130. In an example embodiment, the service instance may be constructed for communication between switch 135 and network flow monitoring appliance 130. Constructing the service instance may involve setting up (i.e., configuring) an application session to transmit (physically or virtually) payload data between switch 135 and network flow monitoring appliance 130, a communication session to manage infrastructure resources and connectivity controls for payload data streams, and a transport session to control the physical movement of the payload data.

In an indirectly attached mode (e.g., either L2 or L3 adjacent), manual configuration may be used at each end to establish control channel connectivity. For example, the user may first enable RISE mode by using CLI by command appliance (config)# [no] rise.) The user may configure port-channel, management VLANs and management IP on network flow monitoring appliance 130. Port-channel 134 may be separately configured on switch 135. Member ports (e.g., 5/1, 5/2, 6/1 and 6/2) may be appropriately added into port channel 134, suitable service instances may be constructed and VLAN groups may be assigned, etc.

In embodiments where port channel 134 is a vPC, network flow monitoring appliance 130 may be assigned the primary role as the authority for handshake results. If switch 135 has a current primary role, then virtual slot and sub-slot number may be assigned directly. If switch 135 has a secondary role, then virtual slot and sub-slot number from the primary may be conveyed. The virtual slot may be marked as "secondary" from the vPC peer, and it may not be attached or reloaded from the secondary vPC peer.

Figure 3:
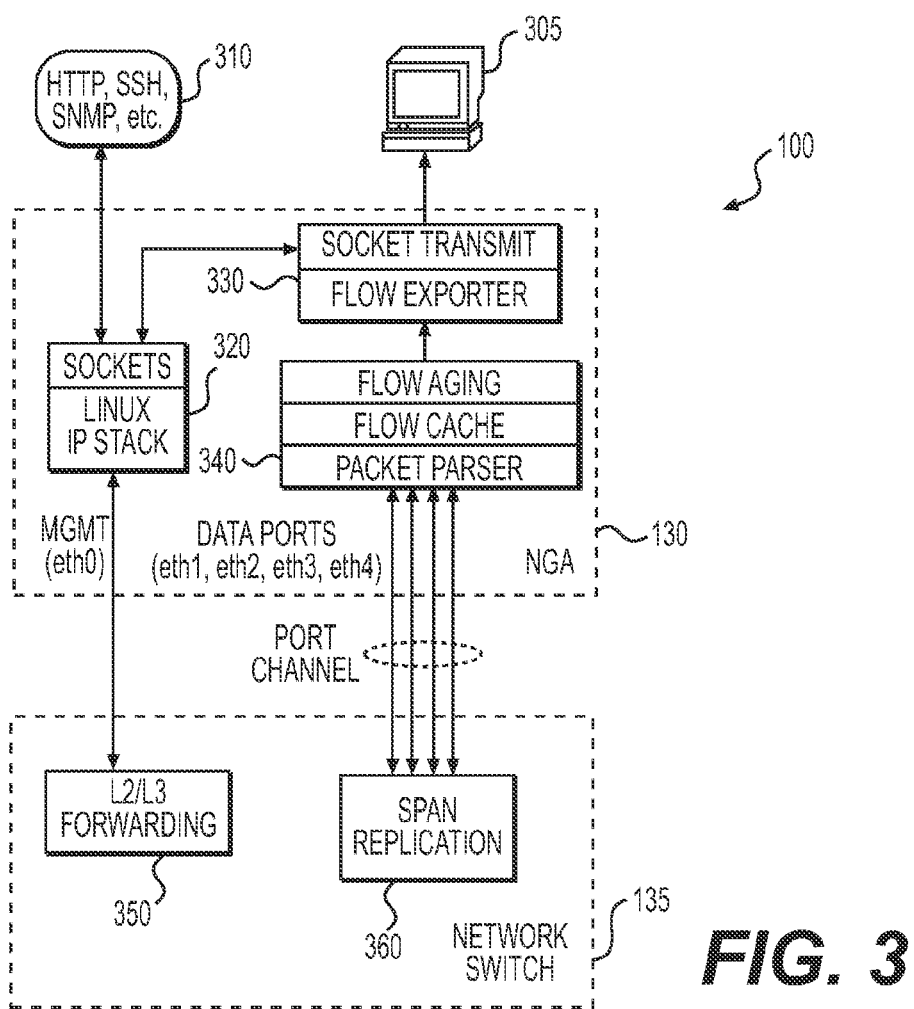
FIG. 3 illustrates a block diagram of an exemplary network flow monitoring architecture, consistent with certain disclosed embodiments.

Now that the configuration of the network and the interface between network flow monitoring appliance 130 and network switch 135 have been explained, systems and methods for monitoring network flow attributes associated with a network switch 135 or other piece of network node can be explained in more detail. FIG. 3 illustrates an exemplary block diagram and data flow associated with a conventional method for monitoring network flow parameters associated with a network switch.

As illustrated in FIG. 3, network switch 135 may include a set of interfaces or VLANs that are configured as the source for a Switch Port Analyzer (SPAN) session. The destination for the SPAN session may be configured as a different set of interfaces which are connected to the data ports of network probe 130. These are optionally bundled together into a port-channel, to achieve optimized load-balancing across all four of the data interfaces.

The management port on the network probe 130 may be a 1 Gigabit interface where the IP address of the network probe is assigned. This port is typically used for all IP connectivity to the network probe 130 such as web GUI, telnet/ssh, and SNMP 310. It is also where the network probe 130 exports network flow records over UDP datagrams.

The primary purpose of the network probe 130 is to collect flow information and export flow records on behalf of the network switch 135 to external flow collectors 305. Maintenance of a large flow cache and implementation of flow timeouts and flow record export can be very resource-intensive, particularly for devices that are capable of switching a large number of simultaneous flows like many network switches 135. Therefore, offload of this task to a standalone appliance can make a tot of sense.

The format of flow records that describe flows being forwarded through the switch has been standardized to facilitate interoperability among devices produced by different manufacturers. The most common formats in use today are NetFlow v5 and NetFlow v9. NetFlow v5 defines a static flow record structure, whereas the v9 specification allows some flexibility and individual fields describing a flow can be included or omitted optionally.

One common problem with implementing the flow export function in a standalone device (e.g., network probe 130) external to the forwarding device (e.g., network switch 135) is that some of the standard required fields describing a flow are not directly discernible by the exporting device. Traditionally, only the raw packets that make up a flow are replicated and copied to the exporting device, and so all information associated with the flow must be obtained from those raw packets and nothing else. For example, the standard definition of a flow record in NetFlow v5 is structured with the fields listed in Table 1. The fields are denoted as [KEY] fields indicate that the field is one of the components that may be used to uniquely distinguish different flows.

TABLE 1

Netflow v5 Standard Flow Record

| Field Name | Description |
| --- | --- |
| Source IP Address | [KEY] Source IP address for all packets in the flow. |
| Destination IP Address | [KEY] Destination IP address for all packets in the flow. |
| Next Hop | The IP address of the next hop where the packet was forwarded, if it was routed at the IP layer rather than being bridged at the MAC layer by the forwarding device. |
| Input Interface | [KEY] The interface on the forwarding device where all packets in this flow were received. |
| Output Interface | [KEY] The output interface to which all packets in this flow were sent by the forwarding device. |
| Packet Count | The number of packets observed on this flow for the duration of time this record represents. |
| Octet Count | The number of bytes observed on this flow for the duration of time this record represents. |
| First Packet | A timestamp for the first packet observed on this flow for the duration of time this record represents. |
| Last Packet | A timestamp for the last packet observed on this flow for the duration of time this record represents. |
| Source Port | [KEY] The source TCP or UDP port for all packets in the flow. |
| Destination Port | [KEY] The destination TCP or UDP port for all packets in the flow. |
| TCP Flags | The combination of all TCP flag bits observed in all packets on this flow for the duration of time this record represents. |
| IP Protocol | [KEY] The value of the "Protocol" field in the IP header for all packets in the flow. |
| Type Of Service | The value of the "Type of Service" field in the IP header for all packets in the flow. |
| Source AS | The BGP (Border Gateway Protocol) Autonomous System number representing the domain from which packets were received for this flow by the forwarding device. |
| Destination AS | The BGP Autonomous System number representing the domain to which packets were forwarded for this flow by the forwarding device. |
| Source Mask | The number of bits in the prefix mask applied to the source IP address of the flow by the forwarding device. |
| Destination Mask | The number of bits in the prefix mask applied to the destination IP address of the flow by the forwarding device. |

Of all these fields, Table 2 shows those which can be obtained directly by an external appliance (e.g., network flow monitoring device 130) by observation of the raw packet stream.

TABLE 2

Fields that are Directly Observable

| Directly Observable Field Name | How it is Obtained |
| --- | --- |
| Source IP Address | Obtained by examination of the IP header in packets of the flow. |

TABLE 2-continued

Fields that are Directly Observable

| Directly Observable Field Name | How it is Obtained |
|---|---|
| Destination IP Address | Obtained by examination of the IP header in packets of the flow. |
| Packet Count | Obtained by counting the number of packets that are mapped to a particular flow because all of the [KEY] fields are identical. |
| Octet Count | Obtained by counting the number of bytes present in packets that are mapped to a particular flow because all of the [KEY] fields are identical. |
| First Packet | Obtained by sampling an internal clock when the first packet of a flow is observed. |
| Last Packet | Obtained by sampling an internal clock when the last packet of a flow is observed for the duration of time this record represents. |
| Source Port | Obtained by examination of the TCP or UDP header in packets of the flow. |
| Destination Port | Obtained by examination of the TCP or UDP header in packets of the flow. |
| TCP Flags | Obtained by examination of the TCP header in packets of the flow. |
| IP Protocol | Obtained by examination of the IP header in packets of the flow. |
| Type Of Service | Obtained by examination of the IP header in packets of the flow. |

On the other hand, the following fields, the fields in Table 3 cannot be obtained directly by observation of the raw packet streams. These fields require additional meta-data or additional context outside of the packet data itself.

TABLE 3

Fields that Require Additional Information to Derive

| Fields That Are Not Directly Observable | Additional Information Required |
|---|---|
| Next Hop | Obtained by using the Destination IP Address to perform a lookup in the forwarding device's Routing Table, also known as its Forwarding Information Base (FIB). |
| Input Interface | The forwarding device knows this information by observing on which of its interfaces the packets of the flow arrive. |
| Output Interface | Obtained by using the Destination IP Address to perform a lookup in the forwarding device's FIB. This is the interface on which the packet is forwarded to move it closer toward its eventual destination. |
| Source AS | Obtained by consulting BGP-specific information inside the forwarding device. |
| Destination AS | Obtained by consulting BGP-specific information inside the forwarding device. |
| Source Mask | Obtained by consulting the FIB inside the forwarding device. |
| Destination Mask | Obtained by consulting the FIB inside the forwarding device. |

As indicated in the Tables above, for NetFlow v5 there are 7 fields that are not directly observable by an external appliance by inspection of raw packet data alone. Therefore when such a device provides network flow monitoring export functions on behalf of a forwarding device such as a network switch 135, the information is not complete. Conventional network probes typically populate zeroes or some other constant value into these fields. This can cause interoperability problems with some collectors 305, and can limit the value of the analysis that those collectors perform on the flow record data.

Figure 4:
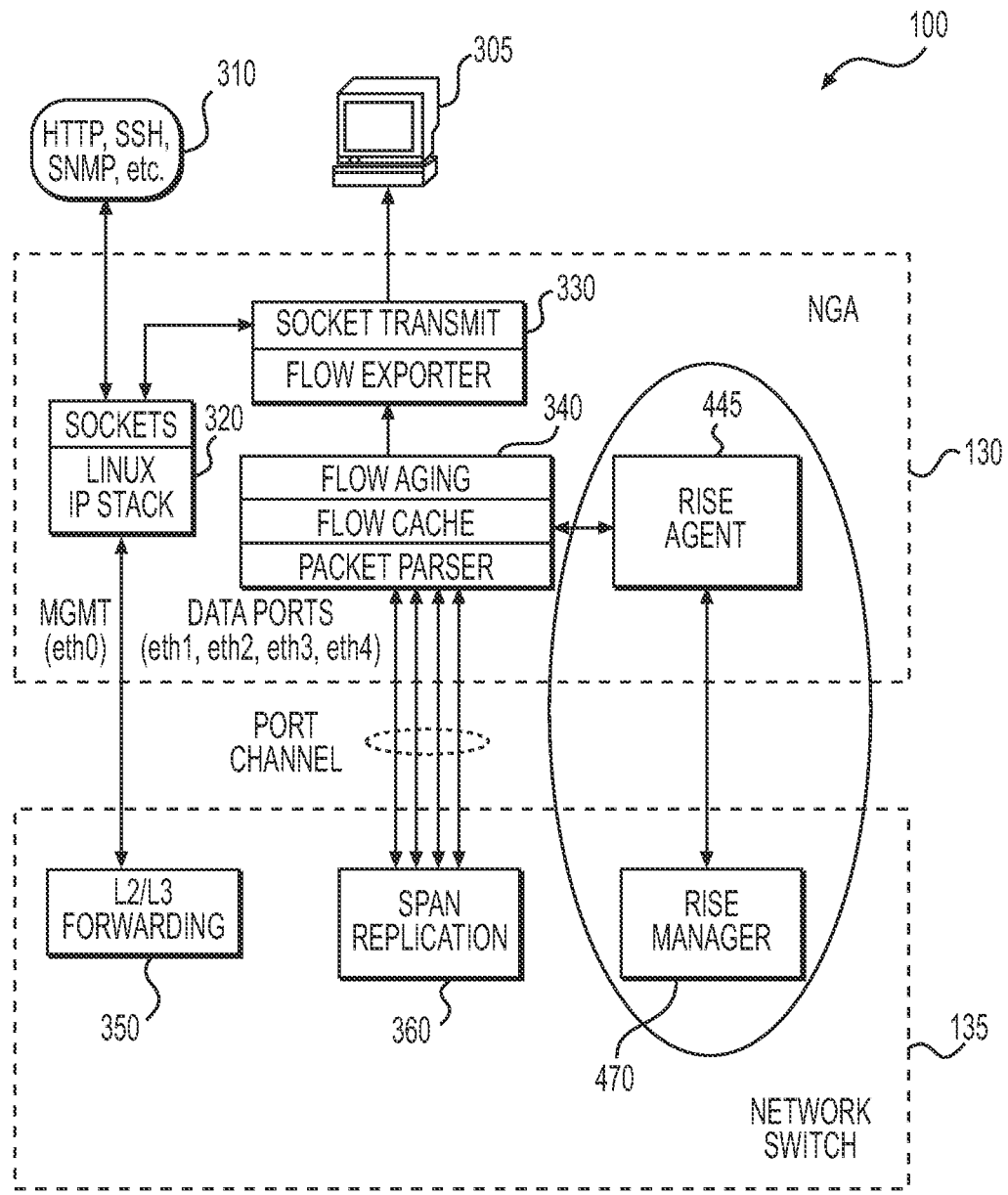
FIG. 4 illustrates a block diagram of another exemplary network work monitoring architecture, in accordance with certain disclosed embodiments.
Figure 5:
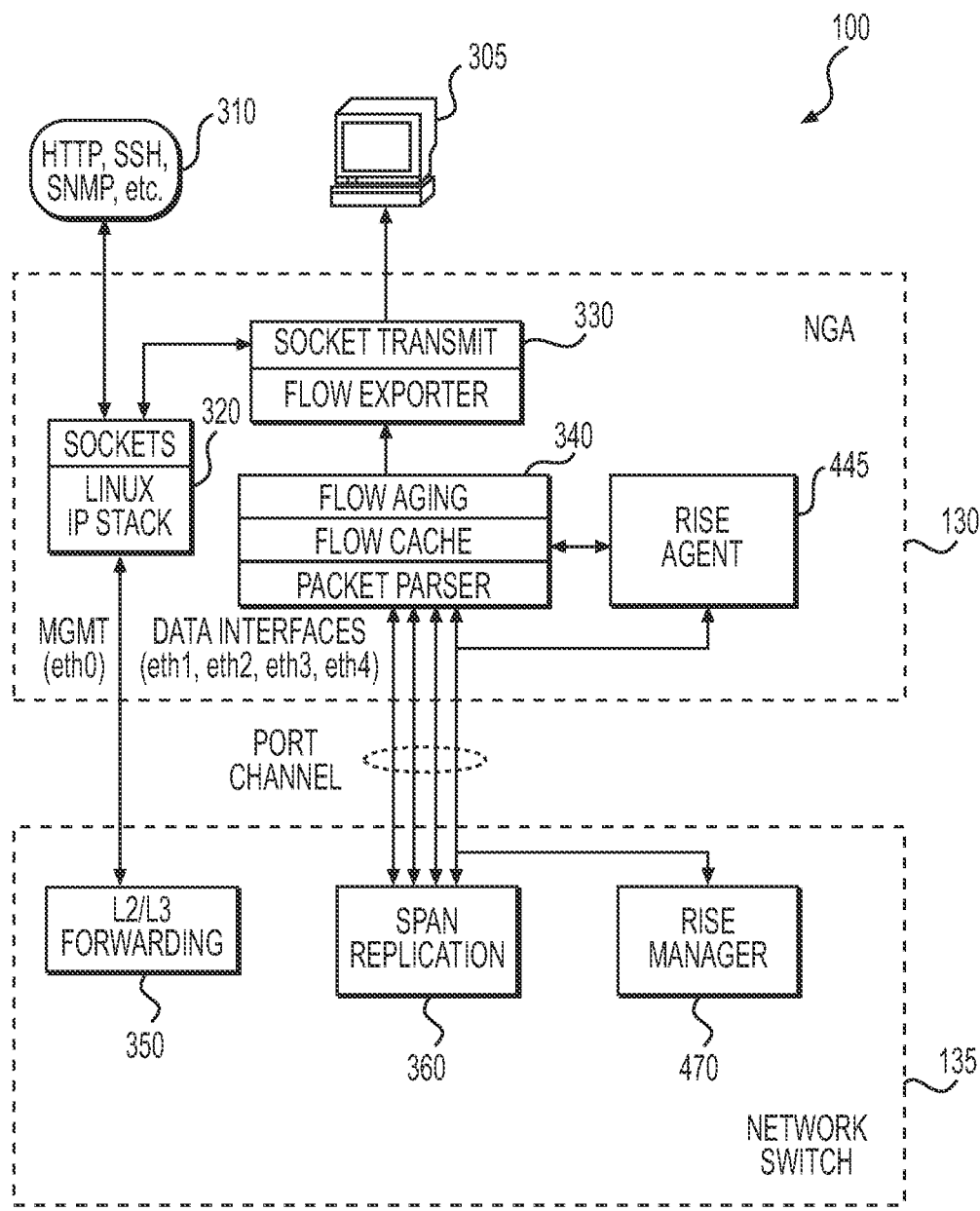
FIG. 5 illustrates a block diagram of yet another exemplary network work monitoring architecture, in accordance with certain disclosed embodiments.

FIGS. 4 and 5 illustrate exemplary block diagrams and data flows associated with network monitoring devices and methods in accordance with the disclosed embodiments. As illustrated in FIGS. 4 and 5, systems and methods consistent with the disclosed network flow monitoring schemes utilize the a command and control port (such as Cisco's RISE port) for transferring the network flow information that cannot be discerned from the packet information alone, such as that shown in Table 3 from network switch 135 to network flow monitoring appliance 130 for analysis by collectors 305.

As explained above, the RISE feature allows an external appliance such as network flow monitoring appliance 130 to be integrated with the switch as if it were a service module inserted into the same chassis. Using RISE, messages can be exchanged between network flow monitoring appliance and the switch 135 to implement Inter-Process Communications (IPC). The use of IPC can result in a very tight integration between the network flow monitoring appliance 130 and the network switch 135, causing the network flow monitoring appliance 130 and switch 135 function as a single, integrated device.

According to certain exemplary embodiments, in addition to achieving virtual integration between the network flow monitoring appliance 130, the RISE communication channel may also be used to obtain the missing information in flow records exported by the network flow monitoring appliance 130 to collectors 305. The RISE channel may be physically implemented as an additional connection between a RISE agent module 445 of network flow monitoring appliance 130 and a RISE manager module 470 associated with network switch 135 as shown in FIG. 4. Alternatively or additionally, the RISE messages may share the same port-channel used by the SPAN feature to pass the replicated traffic between the RISE agent module 445 of network flow monitoring appliance 130 and the RISE manager module 470, as shown in FIG. 5.

Figure 6:
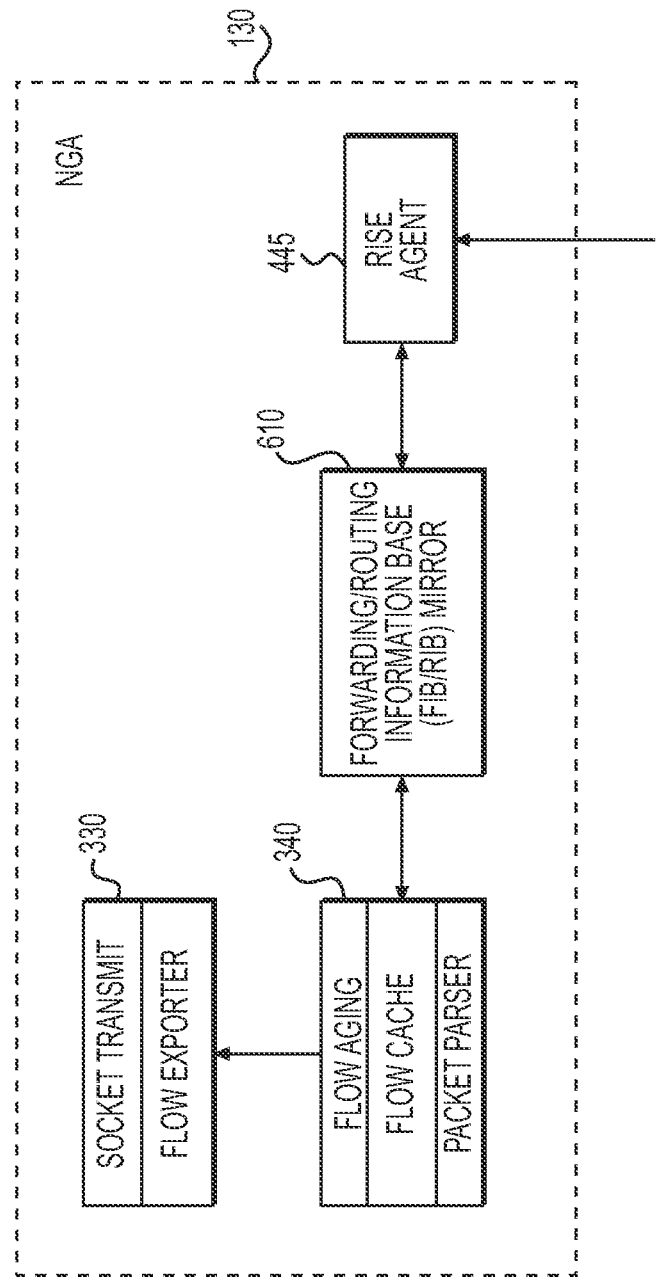
FIG. 6 illustrates a block diagram showing certain components associated with an exemplary portable system for monitoring network flow attributes, consistent with certain disclosed embodiments.

To obtain the missing network flow fields that are not directly observable by analyzing the packet data, the main resource that is required is the information contained in the Forwarding Information Base (FIB) of the network switch 135. Most, if not all, of the missing fields can be obtained from the FIB. There are two primary methods for using RISE to gain access to the FIB in the network flow monitoring appliance 130: (1) maintain a separate copy of the network switch 135 inside a memory associated with network flow monitoring appliance 135, such as flow cache memory 340 (as illustrated in the method shown in flowchart 700 of FIG. 7), or (2) request FIB data from the network switch 135 as needed when a new flow is observed (as illustrated in the method shown in flowchart 800 of FIG. 8), which data can be added to flow cache memory 340 of network flow monitoring appliance 130. FIG. 6 illustrates network flow monitoring appliance 130 having stored FIB mirror table from network switch 135 (transmitted via RISE channel through RISE agent 445) in flow cache memory 340.

Figure 7:
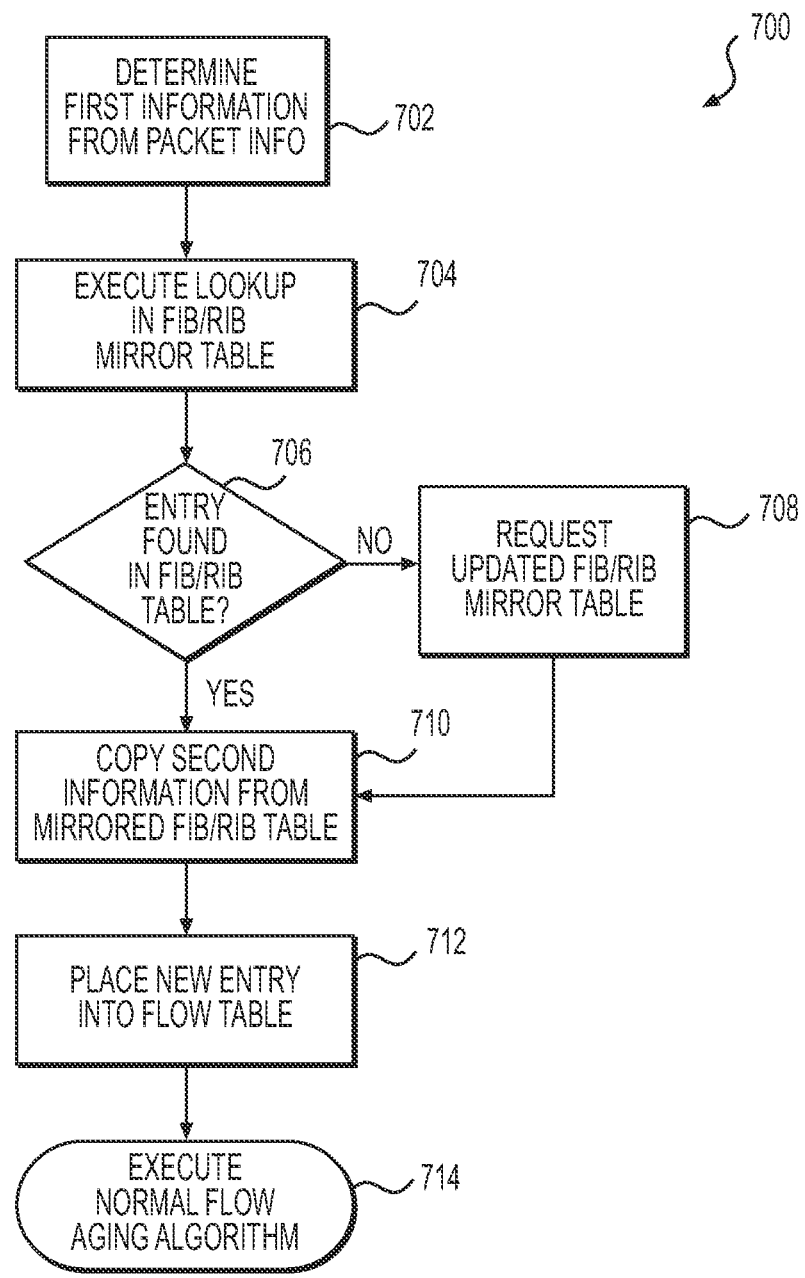
FIG. 7 provides a flowchart showing an exemplary method for monitoring network flow attributes associated with a network node, in accordance with certain disclosed embodiments.

FIG. 7 provides a flowchart 700 illustrating an exemplary method for monitoring network flow attributes in accordance with the disclosed embodiments. In the method of FIG. 7, the network flow monitoring appliance 130 duplicates the FIB from the network switch 135 inside its own memory space (e.g., in a flow cache memory) and, therefore, will have access to all the information it needs to populate a full flow record by direct observation of the raw SPAN traffic. A set of algorithms and a communication protocol will be developed for use between the network flow monitoring appliance 130 and network switch 135 over the RISE channel. When the network flow monitoring appliance 130 is first initialized, it requests a full download of the FIB from the network switch 135. After the initial download, updates to the FIB may be pushed from the network switch 135 to the network flow monitoring appliance 135 using additional protocol messages. Alternately, the network flow monitoring appliance 135 may periodically request FIB updates on its own schedule, or even periodically perform a full FIB download, if necessary. FIG. 7 is an illustration of implementing a mirror of the FIB inside the memory of the network flow monitoring appliance 130.

Figure 8:
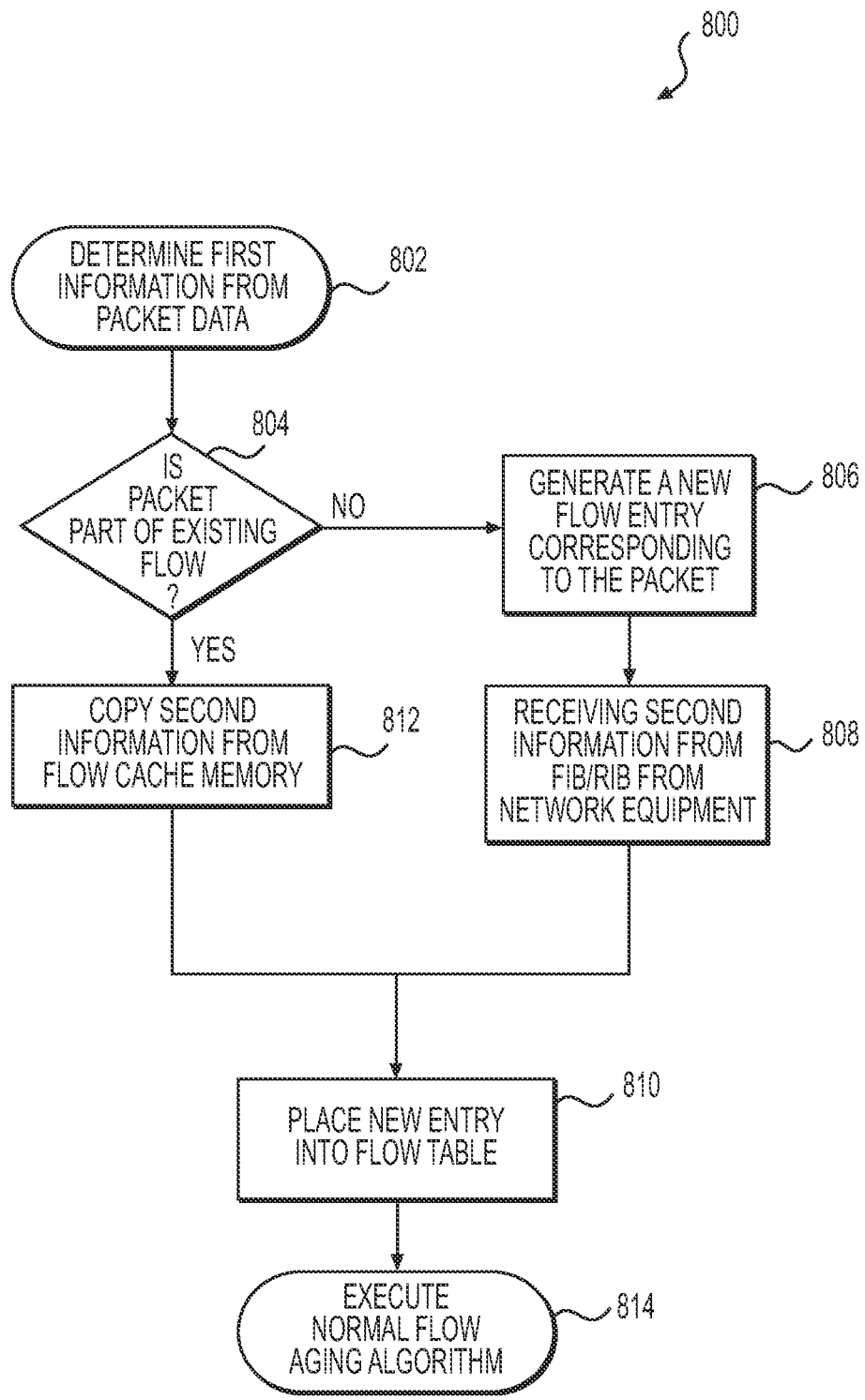
FIG. 8 provides a flowchart depicting another exemplary method for monitoring network flow attributes associated with a network node, consistent with certain disclosed embodiments.

Regardless of whether network flow monitoring appliance 130 implements the method of FIG. 7 or FIG. 8, the network flow monitoring appliance 130 maintains its own flow cache. It populates this cache by direct observation of raw SPAN packets that are replicated to the device. For each SPAN packet received, the network flow monitoring appliance 130 performs a lookup in its flow cache using key fields that are available from the packet data. If an existing flow is found, it is updated using information from the new packet such as the size in octets of the new packet and the TCP flags present, for example. If no existing flow is found, a new one is created. Flows are aged out of the cache according to well-known flow aging algorithms. Flow records providing statistics and other information about ongoing and closed flows may be reported to external collectors.

As illustrated in FIG. 7, the process commences when the network flow monitoring appliance 130 determines first information from packets being transmitted through network switch 135 (Step 702). As explained, first information may include information that is discernible from the packet information alone, such as the information shown in Table 2, above. Once data that can be discerned from the packet has been identified, network flow monitoring appliance 130 may execute a lookup operation in FIB mirror table that is stored in network flow monitoring appliance 130 (Step 704) to determine if the entry is found in the table. If the entry is found in the FIB mirror table (Step 706: Yes), network flow monitoring appliance 130 may copy second information (information that is not discernible through analysis of packet data alone, such as that shown in Table 3, above) (Step 710). The flow information for the packet may be written to flow cache of network flow monitoring appliance 130 (Step 712), and the process may execute the normal flow aging algorithm (Step 714).

If the entry is not found in the FIB table (Step 706: No), network flow monitoring appliance 130 may request an updated FIB mirror table from network switch 135 (Step 708). Once the updated FIB mirror table has been stored in the flow cache, network flow monitoring appliance 130 may copy second information (Step 710). The flow information for the packet may be written to flow cache of network flow monitoring appliance 130 (Step 712), and the process may execute the normal flow aging algorithm (Step 714).

FIG. 8 provides a flowchart 800 illustrating a method for monitoring network flows by a network flow monitoring appliance 130 that doesn't store a copy of the FIB table in its flow cache memory. As illustrated in FIG. 8, the process commences when the network flow monitoring appliance 130 identities first information for a packet that is being transmitted through network switch 135. As explained, first information may include information that is discernible from the packet information alone, such as the information shown in Table 2, above. Once data that can be discerned from the packet has been identified, network flow monitoring appliance 130 may execute a lookup operation its flow cache to determine if the packet is part of an existing flow. If the entry is part of an existing flow (Step 804: Yes), network flow monitoring appliance 130 may copy second information (information that is not discernible through analysis of packet data alone, such as that shown in Table 3, above) (Step 812). The flow information for the packet may be written to flow cache of network flow monitoring appliance 130 (Step 810), and the process may execute the normal flow aging algorithm (Step 814).

If the packet is not part of an existing flow (Step 804: No), network flow monitoring appliance 130 may generate a new flow entry corresponding with the packet (Step 806), and import the first information into the new entry. Network flow monitoring appliance 130 may request second information from the table from network switch 135. In response to the request, network flow monitoring appliance 130 may receive second information (information that is not discernible through analysis of packet data alone, such as that shown in Table 3, above) (Step 808). The flow information for the packet may be written to flow cache of network flow monitoring appliance 130 (Step 810), and the process may execute the normal flow aging algorithm (Step 814).

It will be apparent to those skilled in the art that various modifications and variations can be made to the disclosed portable system and associated methods for monitoring network flow attributes in a piece of networking equipment. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for monitoring flow attributes at a network probe coupled to a first device in a network node, wherein the network probe collects flow information for export on behalf of the first device, the method comprising:
    detecting, by a processor of a network probe coupled to a first device at the network node, first information indicative of transmission of a packet through the network node, the first information being discernible, at the network probe, from raw data contained within the packet, wherein the network probe comprises the processor and a memory and the first device comprises a second processor and a second memory, the processor and the memory of the network probe being different from the second processor and the second memory of the first device;
    determining, by the network probe, that the packet is not part of an existing flow;
    generating, in the memory of the network probe, a new flow entry corresponding to the packet;
    receiving, at the network probe, from the first device of the network node, second information associated with the transmission of the packet through the network node, the second information contained in a forwarding information base (FIB) stored in the second memory of the first device and which cannot be discerned, at the network probe, from information contained within the packet; and
    writing, in the memory of the network probe, the second information to the new flow entry corresponding to the packet.

2. The computer-implemented method of claim 1, wherein determining that the packet is not part of an existing flow includes:
    comparing, at the network probe, the first information with flow information contained in the memory of the network probe; and determining, at the network probe, based on the comparison, that the first information does not match flow information contained in the memory of the network probe.

3. The computer-implemented method of claim 1, further comprising providing, by the network probe to the first device, third information associated with the packet, the third information causing the network node to provide the second information to the network probe.

4. The computer-implemented method of claim 1, wherein the first information includes information that can be determined based on an analysis of raw data associated with the packet.

5. The computer-implemented method of claim 4, wherein the first information includes at least one selected from the group consisting of a source IP address, a destination IP address, a source port, a destination port, and an IP protocol.

6. The computer-implemented method of claim 1, wherein the second information includes information that cannot be determined based on an analysis of raw data associated with the packet.

7. The computer-implemented method of claim 6, wherein the second information includes at least one selected from the group consisting of a next hop for the packet, an input interface, an output interface, an indication of a source autonomous system (AS) from which the packet was generated, an indication of a destination AS to which the packet is being sent, information indicative of a source mask associated with the packet, and information indicative of a destination mask associated with the packet.

8. A computer-implemented method for monitoring flow attributes at a network probe coupled to a first device in a network node, wherein the network probe collects flow information for export on behalf of the first device, the method comprising:
    detecting, by a processor at a network probe coupled to a first device at the network node, first information indicative of transmission of a packet through the network node, the first information being discernible, at the network probe, from raw data contained within the packet, wherein the network probe comprises the processor and a memory and the first device comprises a second processor and a second memory, the processor and the memory of the network probe being different from the second processor and the second memory of the first device;
    comparing, at the network probe, the information indicative of the transmission of the packet with information contained in a forwarding information base (FIB) associated with the network node;
    determining, at the network probe, based on the comparison, that the packet is not part of an existing flow;
    generating, in the memory of the network probe, a new flow entry corresponding to the packet;
    retrieving, at the network probe, from the second memory of the first device, an updated FIB containing second information associated with the transmission of the packet through the network node, the second information not discernible, at the network probe, from information contained within the packet; and
    writing, in the memory, the second information to the new flow entry corresponding to the packet.

9. The computer-implemented method of claim 8, wherein the FIB is stored in the first device and the memory of the network probe includes a copy of the FIB.

10. The computer-implemented method of claim 8, wherein the first information includes information that can be determined based on an analysis of raw data associated with the packet.

11. The computer-implemented method of claim 10, wherein the first information includes at least one selected from the group consisting of a source IP address, a destination IP address, a source port, a destination port, and an IP protocol.

12. The computer-implemented method of claim 8, wherein the second information includes information that cannot be determined based on an analysis of raw data associated with the packet.

13. The computer-implemented method of claim 12, wherein the second information includes at least one selected from the group consisting of a next hop for the packet, an input interface, an output interface, an indication of a source autonomous system (AS) from which the packet was generated, an indication of a destination AS to which the packet is being sent, information indicative of a source mask associated with the packet, and information indicative of a destination mask associated with the packet.

14. The computer-implemented method of claim 8, wherein detecting the first information includes monitoring the first information via a SPAN port associated with the first device.

15. The computer-implemented method of claim 14, wherein the network probe is coupled to the first device via a virtual integration port that facilitates communication between the network probe and the first device such that the network probe is configured as a virtual line card coupled to the first device.

16. The method of claim 8, wherein comparing the information indicative of the transmission of the packet with information contained in the forwarding information base (FIB) associated with the network node includes comparing the information indicative of the transmission of the packet with a copy of the information indicative of the transmission of the packet with information contained in the FIB associated with the first device, the copy stored in the memory of the network probe.

17. An apparatus for coupling to a first device to monitor network flow parameters wherein the coupling is via an externally-accessible port of the first device, the apparatus comprising:
    a memory configured to store network traffic parameters associated with existing network packet flows;
    a processor, communicatively coupled to the memory and configured to:
        detect first information indicative of transmission of a packet through the network node, the first information being discernible, at the apparatus, from raw data contained within the packet;
        determine that the packet is not part of an existing network flow;
        creating, in the memory, a new flow entry corresponding to the packet;
        receive, through the externally-accessible port of the first device, second information associated with the transmission of the packet through the first device, the second information contained in a forwarding information base (FIB) stored in the second memory of the first device and which cannot be discerned, at the apparatus, from information contained within the packet; and
        write, in the memory, the second information to the new flow entry corresponding to the packet.

18. The apparatus of claim 17, wherein the processor is configured to determine that the packet is not part of an existing network flow by:
- comparing the first information with flow information contained in the memory of the network probe; and
- determining, based on the comparison, that the first information does not match flow information contained in the memory of the network probe.

19. The apparatus of claim 17, wherein the processor is configured to provide, to the first device, third information associated with the packet, the third information causing the first device to provide the second information to the network probe.

20. The apparatus of claim 17, wherein the first information includes information that can be determined based on an analysis of raw data associated with the packet.

21. The apparatus of claim 20, wherein the first information includes at least one selected from the group consisting of a source IP address, a destination IP address, a source port, a destination port, and an IP protocol.

22. The apparatus of claim 17, wherein the second information includes information that cannot be determined based on an analysis of raw data associated with the packet.

23. The apparatus of claim 22, wherein the second information includes at least one selected from the group consisting of a next hop for the packet, an input interface, an output interface, an indication of a source autonomous system (AS) from which the packet was generated, an indication of a destination AS to which the packet is being sent, information indicative of a source mask associated with the packet, and information indicative of a destination mask associated with the packet.

* * * * *